(12) United States Patent
Yu

(10) Patent No.: US 9,074,061 B2
(45) Date of Patent: Jul. 7, 2015

(54) EVA RECYCLING METHOD

(75) Inventor: Sui-Chieh J. Yu, Portland, OR (US)

(73) Assignee: NIKE, Inc., Beaverton, OR (US)

(*) Notice: Subject to any disclaimer, the term of this patent is extended or adjusted under 35 U.S.C. 154(b) by 0 days.

(21) Appl. No.: 13/605,577

(22) Filed: Sep. 6, 2012

(65) Prior Publication Data

US 2014/0066530 A1 Mar. 6, 2014

(51) Int. Cl.

| | |
|---|---|
| *C08J 11/04* | (2006.01) |
| *C08L 31/04* | (2006.01) |
| *A43B 13/04* | (2006.01) |
| *B29B 17/00* | (2006.01) |
| *C08J 9/00* | (2006.01) |
| *C08J 9/06* | (2006.01) |
| *C08K 3/00* | (2006.01) |
| *B29K 23/00* | (2006.01) |
| *B29K 105/04* | (2006.01) |

(52) U.S. Cl.
CPC ............... *C08J 11/04* (2013.01); *C08L 31/04* (2013.01); *A43B 13/04* (2013.01); *B29B 17/00* (2013.01); *C08J 9/0061* (2013.01); *C08J 9/06* (2013.01); *C08J 2201/026* (2013.01); *C08J 2203/02* (2013.01); *C08J 2203/04* (2013.01); *C08J 2300/30* (2013.01); *C08J 2323/08* (2013.01); *C08J 2400/30* (2013.01); *C08J 2423/08* (2013.01); *B29K 2023/083* (2013.01); *B29K 2105/04* (2013.01); *C08K 3/0033* (2013.01)

(58) Field of Classification Search
CPC . C08L 2666/00; C08L 23/0853; C08L 31/04; C08J 9/00; C08J 11/00; C08J 9/06; C08J 11/04; C08J 9/0061; A43B 13/04; C08K 3/0033; B29B 17/00

USPC ............ 521/40.5, 41, 46, 47, 50, 40; 524/74, 524/528, 533, 536, 836, 855, 856; 525/55, 525/145, 165, 177, 184, 190, 240

See application file for complete search history.

(56) References Cited

U.S. PATENT DOCUMENTS 6,319,969 B1 * 11/2001 Walther et al. ................ 524/300
2008/0244926 A1 * 10/2008 Yu et al. ............................ 36/28

FOREIGN PATENT DOCUMENTS

| GB | 2016475 A | 9/1979 |
| JP | 2000234034 A | 8/2000 |
| JP | 2005023190 A | 1/2005 |
| WO | 2007139832 A2 | 12/2007 |

OTHER PUBLICATIONS

Machine translation of JP 2000-234034.*
Dupont's Elvax 265 Product Data Sheet.*
International Search Report & Written Opinion in PCT Application No. PCT/US2013/054638 mailed on Feb. 26, 2014.

* cited by examiner

*Primary Examiner* — Frances Tischler
(74) *Attorney, Agent, or Firm* — Honigman Miller Schwartz and Cohn LLP; Anna M. Budde; Jonathan P. O'Brien

(57) ABSTRACT

A method of recycling scrap ethylene-vinyl acetate (EVA) foam involves foaming and crosslinking a blend containing virgin EVA resin and scrap EVA foam, as well as a crosslinking agent and blowing agent for the EVA resin. The blend further contains a compatibilizer, which is a hydrogenated petroleum resin.

14 Claims, 1 Drawing Sheet

| Step | CP | CMP | IPF | Phylon Direct | IP |
|---|---|---|---|---|---|
| 1 | Batch up | Batch up | Batch up | Batch up | Batch up |
| 2 | Kneader mix | Kneader mix | Kneader mix | Kneader mix | Kneader mix |
| 3 | Mill Mix | Mill mix | Mill/extruder mix | Mill mix | Mill/extruder mix |
| 4 | Calender or pelletize | Calender or pelletize | Pelletize | Calender or pelletize | Pelletize |
| 5 | Slab stock press | Cavity load weigh up | Inject | Cavity load weigh up | Blend and dry |
| 6 | Skive | Preform press | Stabilize | Heating press process | Inject/Press |
| 7 | Mirror split | Stabilize | Buff skin | Stabilize | Stabilize |
| 8 | Diecut preform blanks | (Buff sidewalls) | Phylon press process | Stock | Stock |
| 9 | Preform shape | Phylon press process | Stock | | |
| 10 | Phylon press process | Stock | | | |
| 11 | Stock | | | | |

| Step | CP | CMP | IPF | Phylon Direct | IP |
|---|---|---|---|---|---|
| 1 | Batch up | Batch up | Batch up | Batch up | Batch up |
|  | ↓ | ↓ | ↓ | ↓ | ↓ |
| 2 | Kneader mix | Kneader mix | Kneader mix | Kneader mix | Kneader mix |
|  | ↓ | ↓ | ↓ | ↓ | ↓ |
| 3 | Mill Mix | Mill mix | Mill/extruder mix | Mill mix | Mill/extruder mix |
|  | ↓ | ↓ | ↓ | ↓ | ↓ |
| 4 | Calender or pelletize | Calender or pelletize | Pelletize | Calender or pelletize | Pelletize |
|  | ↓ | ↓ | ↓ | ↓ | ↓ |
| 5 | Slab stock press | Cavity load weigh up | Inject | Cavity load weigh up | Blend and dry |
|  | ↓ | ↓ | ↓ | ↓ | ↓ |
| 6 | Skive | Preform press | Stabilize | Heating press process | Inject/Press |
|  | ↓ | ↓ | ↓ | ↓ | ↓ |
| 7 | Mirror split | Stabilize | Buff skin | Stabilize | Stabilize |
|  | ↓ | ↓ | ↓ | ↓ | ↓ |
| 8 | Diecut preform blanks | (Buff sidewalls) | Phylon press process | Stock | Stock |
|  | ↓ | ↓ | ↓ |  |  |
| 9 | Preform shape | Phylon press process | Stock |  |  |
|  | ↓ | ↓ |  |  |  |
| 10 | Phylon press process | Stock |  |  |  |
|  | ↓ |  |  |  |  |
| 11 | Stock |  |  |  |  |

EVA RECYCLING METHOD

INTRODUCTION

EVA is a co-polymer made from two different monomer types being ethylene and vinyl acetate. In a foam state, EVA has rubber like properties, making it useful where cushioning is important such as in midsoles, sock liners, and unit soles in footwear. In EVA, the relative amount of vinyl acetate to ethylene influences polymer properties. Higher vinyl acetate content tends to make the polymer softer and more rubbery, while lower vinyl acetate content tends to make the polymer harder and more crystalline.

EVA foams are made by combining ingredients such as an EVA polymer, fillers, pigments, crosslinking agents, blowing agents, and process aids. Optionally, EVA can be mixed with other polymer types such as rubbers or TPE to increase rubber like nature of the EVA. When the ingredients of an EVA foam are exposed to high temperature conditions, the blowing agent is activated, liberating a gas such as carbon dioxide or nitrogen to form the foam; also, the high temperature conditions activates the crosslinking agent, which reacts with the EVA polymers to give a three dimensional network. EVA foam compositions are compounded to carefully balance the decomposition of the peroxide and the blowing agent in order to produce a stable foam.

EVA foam products are compounded by batch mixing in an ammeter, cooling and dispersal mixing on open mills, and calendaring or granulation to make a final mixed compound ready for production of foam.

Slab stock foam is used for die-cut EVA midsoles, and sock liners. Large steam heat presses are used to make slabs of EVA foam. The slabs are then mechanically skived, cut and shaped to the final parts. As a result of conventional EVA foam manufacture, a considerable amount of scrap foam is generated. For example, scrap can be generated from flashing or C grade parts produced with CP, CMP, IPF, and IP processes. Normally, the scrap foam cannot simply be melt blended with virgin starting materials because the finished foam has thermoset properties that prevent its use in this fashion. It has now been determined that simply grinding spent scrap EVA foam and combining it into a composition containing virgin polymer and foaming materials also fails to lead to acceptable EVA foam products. In particular, incorporation of EVA foam in this way tends to make foams that have poor physical properties and/or unacceptable cosmetic properties.

Especially for midsoles, appearance of a material incorporating recycled EVA foam material is important. It would therefore be advantageous to develop compositions and methods for incorporating higher levels of scrap EVA foam.

SUMMARY

Compositions and methods for incorporating high levels of scrap EVA foam into molded articles made of virgin EVA are based on the discovery that certain compatibilizers can be used to increase the physical properties of the molded articles. Using the compatibilizer thus provides methods of recycling a foamed material by incorporating the used foam material into a virgin EVA resin and foaming. Generally, methods of recycling the scrap EVA foam involve foaming and crosslinking a blend containing virgin EVA resin and scrap EVA foam, the blend further comprising an effective amount of the compatibilizer, along with conventional crosslinking agents and blowing agents.

In various embodiments, compatibilizers are selected from hydrocarbon resins made of medium molecular weight, branched, saturated hydrocarbons of suitable viscosity and physical properties as further described herein. In one embodiment, the compatibilizer is selected from hydrogenated petroleum resins, such as those produced by polymerizing or oligomerizing various cuts of olefins obtained as a byproduct of petroleum cracking. Such compatibilizers are commercially available. Using the compatibilizers, suitable foamed articles can be made that contain up to 30 parts of recycled foam per 100 parts of virgin resin.

In addition to the improved aesthetic appearance, it has also been observed that incorporating the scrap foam at up to 30 parts per 100 parts per virgin resin improves shrinkage and elongation of the resulting foamed articles, and also improves the split tear performance, as measured by standard industry tests.

DRAWINGS

The drawings described herein are for illustrative purposes only of selected embodiments and not all possible implementations, and are not intended to limit the scope of the present disclosure.

FIG. 1 illustrates step-by-step instructions for production of articles incorporating recycled scrap foam.

DESCRIPTION

Discovery of the use of compatibilizers described herein has led to a variety of inventions. Methods of recycling polyolefin resin foams by incorporating scrap foam along with virgin resin to be foamed and crosslinked are provided, along with compositions containing compatibilizers that are useful in the methods.

In one embodiment, a foaming composition suitable for use in making a foamed article contains ethylene vinyl acetate (EVA) copolymer having 15-60 mol percent vinyl acetate, scrap ethylene vinyl acetate foam product, a peroxide crosslinking agent for the EVA polymer, a blowing agent, and a compatibilizer. The foamed article made from the foaming composition incorporates recycled ethylene vinyl acetate foam into foamed articles suitable for commercial use. In various embodiments, the composition contains on the order of 1-19% by weight of the scrap foam product. In another embodiment, the composition contains 1-30 parts of the scrap foam product per 100 parts of the virgin ethylene vinylacetate resin. The nature of the compatibilizer, blowing agent, crosslinking agent, and other additives is described further below. In various embodiments, the compositions contain 1-19% by weight of the scrap foam product and 1-4 parts of the compatibilizer based on 100 parts of the EVA copolymer.

In another embodiment, a method of recycling scrap polyolefin foam involves foaming and crosslinking a blend containing virgin polyolefin resin and scrap polyolefin foam wherein the blend contains, in addition to the polyolefin resin and the polyolefin foam, a crosslinking agent and blowing agent for the polyolefin foam and a compatibilizer as described herein. In a particular embodiment, the invention provides a method of recycling scrap EVA foam by foaming and crosslinking a blend containing virgin EVA resin and scrap EVA foam. The blend contains 100 parts of a virgin EVA resin having 10-60 mole percent vinyl acetate monomer, up to 30 parts of scrap EVA foam based on 100 parts of virgin EVA resin, crosslinking agent, blowing agent, compatibilizer and other components described further below.

In non-limiting embodiments, the compatibilizer is a hydrogenated petroleum resin produced by polymerizing a petroleum fraction obtained as a by-product of petroleum cracking. Examples of petroleum fraction include the C5 cut (e.g., cyclopentadiene, isoprene, and the like) and the C9 cut (e.g., alpha-methylstyrene, indene, and the like). In other non-limiting embodiments, the compatibilizer is a hydrogenated resin produced by polymerizing or oligomerizing one or more of styrene, alpha-methylstyrene, vinyl tolulene, vinyl xylene, propenyl benzene, indene, methylindene, ethylindene, and a terpene.

In a further particular embodiment, the invention provides a method of recycling a foamed EVA material comprising foaming a virgin EVA resin in the presence of the foamed EVA material, blowing agent, and compatibilizer as further described herein.

In another embodiment, a method of recycling EVA foam involves combining virgin EVA resin, scrap EVA foam, blowing agent for the EVA resin, organic peroxide, and a compatibilizer to form a blend. The blend is then heated to a temperature sufficient to decompose the peroxide in order to obtain crosslinking and sufficient to decompose the blowing agent in order to obtain foaming. The method further involves forming the foamed and crosslinked blend into an article that incorporates the scrap EVA foam. The nature of the blowing agent, the organic peroxide, the compatibilizer, and other components used in the method are further described below.

Polyolefin Resins

Polyolefin resins include those that can be foamed by the action of a blowing agent to provide foamed articles for various applications. In a preferred embodiment, the polyolefin resin is based on a copolymer of ethylene and vinyl acetate. In particular embodiments, the resin is based on an ethylene vinyl acetate polymer having 15-60 mole percent of vinyl acetate. Suitable resins are available commercially; non-limiting examples are described in the working examples below.

Scrap Polyolefin Foam

The compositions and methods described herein are used to incorporate scrap polyolefin foams into foamed articles produced from virgin resins. In these embodiments, the invention describes methods of recycling the EVA foam, which is usually produced as a scrap by-product of making foamed articles. For example, EVA is commonly used in midsoles of shoes. As such, the application requires a good aesthetic appearance and retention of physical properties while achieving as high content as possible of recycled scrap foam. Up to 30 parts of scrap EVA foam can be incorporated into newly foamed EVA articles by the methods described herein.

Compatibilizers

The compatibilizers are so-called because using them tends to compatibilize a blend of virgin resin and scrap foam, so that a foamed article produced by foaming the virgin resin in the presence of scrap EVA foam results in foamed articles having suitable aesthetic appearance and physical properties. Without the compatibilizer, prior art compositions are limited in the amount of scrap foam that they contain. With the compatibilizers, up to 30 parts of scrap foam per 100 parts of virgin resin can be incorporated.

Generally, the compatibilizer is selected from a hydrocarbon resin, being a branched saturated hydrocarbon having suitable compatibilization properties. In one embodiment, a compatibilizer is made by oligomerizing various olefins to suitable molecular weights for use in the invention. In one aspect, the compatibilizers are described as a hydrogenated petroleum resin. Examples include a hydrogenated aromatic hydrocarbon resin and a hydrogenated terpene resin. Hydrogenated resins include those that are produced by polymerizing or oligomerizing an olefin or olefins selected from styrene, alpha-methylstyrene, vinyl toluene, vinyl xylene, propenyl benzene, indene, methylindene, ethylindene, and one or more terpenes. These low molecular weight olefins are polymerized or oligomerized to suitable molecular weights.

In a particular embodiment, a compatibilizer is a hydrogenated resin produced by polymerizing a petroleum fraction having certain boiling point ranges and obtained as a by-product of petroleum cracking and reforming. In one embodiment, the compatibilizer is made by hydrogenating the oligomerization product of the C5 petroleum cut (cyclopentadiene, isoprene, and the like). In another embodiment, the compatibilizer is the hydrogenation product of the oligomerized/polymerized C9 petroleum cut (dicyclopentadiene, styrene, indene, methylindene, and the like). Compatibilizers based on aliphatic resins, such as those produced from the C5 petroleum cut, are preferred in some embodiments because they lead to incorporation of lighter color into the foamed articles produced from the scrap foam. Likewise, in some embodiments, compatibilizers made from aromatic resins such as those made from the C9 petroleum cut are less preferred because of higher color development. Suitable compatibilizers can also be made from blends or combinations of hydrocarbon resins. In one aspect, it is preferred to use resins with a low content of polyaromatic hydrocarbon (PAH). In some embodiments, the resin has less than 10 ppm PAH.

Suitable compatibilizers are commercially available. Two commercially available compatibilizers are described in the examples below, being Struktol 60NS and Rhenosin 260. The former is a mixture of light colored aliphatic hydrocarbon resins, sold by Struktol. Rhenosin 260 is based on an aromatic hydrocarbon resin, and is supplied by RheinChemie.

Blowing Agent

The blowing agent is thermally decomposable and is selected from ordinary organic and inorganic chemical blowing agents. The nature of the blowing agent is not particular limited as long as it decomposes under the temperature conditions used in incorporating the foam into the virgin resin. Non-limiting examples of blowing agents include azodicarbonamide, 2,2'-azobisisobutynotrile, azohexahydrobenzonitrile, diazodiaminobenzene, and other azo compounds; benzenesulfonylhydrazide, benzene-1,3-sulfonylhydrazide, diphenylsulfone-3,3'-disulfonylhydrazide, diphenyloxide-4,4'-disulfonylhydrazide, 4,4'-oxybis(benzenesulfonyl hydrazide), p-toluenesulfonylhydrazide, and other sulfonylhydrazide compounds; terephthalazide, p-t-butylbenzazide, and other azide compounds; and sodium bicarbonate, ammonium bicarbonate, ammonium carbonate, and other carbonate compounds.

The decomposition temperature of the blowing agent is typically from about 120-200° C. The amount of blowing agent used is typically 1-20 parts by weight with respect to 100 parts by weight of the virgin resin being foamed. The blowing agent can conveniently be provided in the form of a master batch containing for example about 50% of the virgin resin and 50% by weight of the blowing agent. Examples of blowing agents and conditions for their use are given in the working examples below.

Foam Auxiliaries

A foaming auxiliary can be used to lower the decomposition temperature of the blowing agent. Non-limiting examples include zinc white, zinc oxide, zinc stearate, zinc nitrate, zinc phthalate, zinc carbonate, phosphorous trichloride salt, tribasic zinc sulfate, and other inorganic salts; zinc fatty acid soaps, lead fatty acid soaps, cadmium fatty acid soaps, and other metal soaps; boric acid, oxalic acid, succinic acid, adipic acid, and other acids; urea, ethanolamine, glucose, glycerin, and the like.

In various embodiments, a foaming inhibitor is used to raise the decomposition temperature of the thermally decomposable blowing agent. Non-limiting examples of foaming inhibitors include maleic acid, fumaric acid, phthalic acid, maleic anhydride, phthalic anhydride, and other organic acids; stearoyl chloride, phthaloyl chloride, and other halogenated organic acids; hydroquinone and other polyvalent alcohols; fatty acid amines, amides, oximes, isocyanates, and other organosulfur-containing compounds, phosphorous acid chlorides and other phosphoric acid salts; dibutyltin maleate, tin chloride, tin (II) sulfate, and other tin compounds; as well as hexachloropentadiene and the like.

Crosslinking Agent

Peroxides are normally used in the foaming compositions. Under the temperature conditions of the reaction, the peroxides are activated to begin the process of crosslinking by extracting a hydrogen atom from the polymer backbone and providing sites for crosslinking. Crosslinking the foam in this way during the foaming operation leads to foamed articles having improved physical properties. The nature and the level of the peroxide crosslinking agent is selected to provide suitable foaming and crosslinking in conjunction with the foaming agent. Typically, a crosslinking agent is used at 0.1 to 10 parts per 100 parts of virgin to be foamed. In particular embodiments, the crosslinking agent is used at a level of 0.1 to 5 phr, or 0.1 to 3 phr, 1-5 phr, and 0.1 to 2 phr.

Dicumyl peroxide is a suitable peroxide crosslinking agent. Its use is exemplified in the Examples below. Other suitable peroxides include $\alpha,\alpha'$-di-(t-butylperoxy)diisopropylbenzene; 2,5-dimethyl-2,5-di-(t-butylperoxy)hexane; 2,5-dimethyl-2,5-di-(t-butylperoxy)hexyne-3; n-Butyl 4,4-di-(t-butylperoxy)-valerate; 1,1-bis-(t-butylperoxy)-3,3,5-trimethylcyclohexane; and t-butyl perbenzoate. Such peroxides and peroxides are available as liquids or as free-flowing powders containing neat peroxide in some cases and in others peroxide formulated with fillers or binders such as calcium carbonate, clay, silica cellulose, and polymers such as polypropylene. In other embodiments, the peroxide crosslinking agents are formulated with silicone oils or provided as solutions and water or other solvents. Suitable peroxide crosslinking agents are commercially available, for example from R.T. Vanderbilt Company, Inc. under the VAROX® tradename.

Other Components

Other components can be added to the foaming compositions. Non-limiting examples include fillers, pigments, fire retardants, lubricants, activators, and the like. Examples of fillers include talc, magnesium carbonate, magnesium silicate, calcium carbonate, clay, mica, bearing sulfate, magnesium hydroxide, and the like. The compositions can also contain rubber fillers, such as ethylene propylene, copolymer rubber, ethylene propylene diene copolymer rubber, styrene butadiene rubber, as well as other polyolefin resins, in addition to ethylene vinyl acetate. In the Examples below, stearic acid is used as a lubricant, zinc oxide is used as an activator for the blowing agent, and titanium dioxide is used as a white pigment. All of these components are added as desired to the foaming compositions within a range where the components provide their stated functions and do not negatively impact the advantageous properties of the foamed articles produced from the compositions. Non-limiting examples are given in the working examples below.

Compounding

As noted, two ingredients in compounding EVA foams are the level of peroxide and the type and level of blowing agent used. Both peroxide and blowing agent levels affect hardness and other physical properties. Not only do the amounts need to be balanced, but also the temperature at which they react. If the temperature conditions are such that the blowing agent does not react until most of the peroxide is decomposed, the polymer network will not allow the gas to expand into bubbles to produce a cellular foam. On the other hand, if the blowing agent reacts at too low a temperature before decomposition of the peroxide, the cell walls will not be strong enough to contain the rapidly expanding gas and would tend to collapse. Thus, balancing the decomposition of the peroxide and of the blowing agent is a key to producing stable foam. Suitable conditions are described in the examples below.

A typical process for compounding EVA foam products includes batch mixing in a kneader, cooling and dispersing on open mills, and calendar or granulation line to make the final mix compound ready for production foam An alternative to a batch kneader mixing is a continuous mixing extruder. Instead of batching in discrete lots, this method meters ingredients into an extruder that mixes them continuously to the final compounded pellets ready for vulcanization.

Pelletizing

To produce pellets the hot compound is first fed into an extruder fitted with a perforated die. A cutter immediately in front of the die slices the extruded strings of compound into pellets. Pellets are then either water cooled or air cooled as they are transported first to a sieve grader to separate out uneven sized pellets then to a ribbon blender. The ribbon blender serves the same purpose as batch averaging on the mill for the calender sheet process. Ribbon blend batches should be no more than 500 kg.

In a typical batch mixing process, the polymer is kneaded in the kneader. The kneader blends the polymer, filler, and other ingredients. A dump temperature of around 110° C. can be used. At this temperature, the dicumyl peroxide and the blowing agent tend to be unstable. As a result, the peroxide and blowing agent are added into the kneader at the last minute of mixing. The batch is then dumped into a cooling mill. The cooling mill lowers the temperature of the batch and sheets it off to a dispersal mill.

In the dispersal mill, the mixing of blowing agent and peroxide is completed and the mixture is sheeted off to a calender or a granulation line. At this point the batch temperature is around 80° C. The calendar or granulation line completes the cooling down to about 50° C. or below. At this point, the compound is stable enough to be stored. However, the mixture has a limited shelf life and so should be used without unnecessary delay. The mix times and temperatures for the above batch processes will vary slightly from factory to factory, but the basics are the same.

Foam Productions Slab Stock

Slab stock foam is used for die cut EVA mid soles, sock liners, and conventional Phylon. Large steam heat presses are used to make slabs of EVA foam. The slabs are then mechanically skived, cut and shaped to the final parts.

A typical slab size is 100×200×5 cm and a typical press makes 5 slabs per load. Typical press time is 45 minutes.

In Phylon production, slab stock foam is skived, cut and die cut to preformed lengths. The planks can then be manually shaped to final preforms and preforms remolded to final parts in a hot/cold press cycle.

Starter foam sheet stock is done in a large vertical press with five or six daylights. Platens are about 1 sqm. The ram is typically 80 cm in diameter. The press is heated with saturated steam and is fitted with automatic timers. Each daylight contains one single cavity mold that will produce a slab of EVA foam with approximate dimensions 1,800×1,000×48 mm.

In various embodiments, the molds have a flat top plate and a cavity for a bottom plate, or have cavities in both top and bottom plates. Each mold on the press is identified with a unique number. Typical cavity dimensions are 1000×600×24 mm. A production factory will have a variety of cavity depths available for different preform sizes. Expansion ratio of EVA foam for Phylon starter foam as a rule is about 1.5 to about 2.2 depending on the hardness of starter foam needed.

Accurate press loads need to be determined for each cavity using mold volumes. The variation in volume of similar molds can be up to 5%, and if this is not taken into account will cause permanent variations in the density and hardness of the final EVA sheet. Typical charge weight for the above mold dimensions is about 15 kg.

Press times for sheet stock are 95 to 105 seconds per mm of mold depth, in an exemplary embodiment. Typically this is 40-50 minutes. Mold temperature is advantageously selected to be about 150 to 160'C. Preferably, automatic timers are used to control press times.

Preferably, press temperatures do not fluctuate too much during production. If the mold temperature varies, the density and hardness of the EVA sheets will vary. Temperature of saturated steam is directly proportional to the pressure. Thus changes in pressure are effectively changes in temperature. To minimize the chance of pressure fluctuations the steam feed line from the boiler is preferably direct and not shared with other equipment. A step down pressure gauge can be placed in the feed line just before the press. Pressure should step down at least 0.5 kg/cm$^2$ from feed line to supply line. Steam lines should have automatic condensation blow out valves at each press platen.

It is also important that the top and bottom plates seal properly so that blow-by is prevented. If blow-by occurs during pressing this will lead to low density and differing hardness in portions of the sheet. Blow-by is an indication of poorly maintained molds or an overloaded press cavity.

A buckled mold will also lead to inconsistent sheet hardness and density as this will create an air pocket between the press platen and the mold. This will cause a cold spot in the mold cavity. This is more common when flat top plates are used. A flat top plate should be at least 8 mm thick.

Once demolded, the sheets should be quickly removed and allowed to cool. They should be laid out flat, well supported, and not stacked one on top of one another to allow for unrestricted shrinkage. Cooling like this should be for at least one press cycle.

In a CMP process, calender or granules is used to make a preform directly. The preform is then stabilized and remolded to final parts in hot/cold press cycle as per the continuous Phylon process. In a hot cycle, 140° C. is applied to a minimum of one minute on preform surface to insure the proper melting of crystalline polymer blocks. On the cold cycle process, a maximum of 30° C. is achieved at demolding in order to assure sufficient resetting of the EVA foam.

In an IP process, granules are used to make a final net molded part. The compound is molded in an extruder/plasticized and then injected under pressure into a final part mold. The injected part is then trimmed and stabilized.

Flow charts for various processes of making parts are shown in FIG. 1. In Conventional Phylon (CP), raw material compound is pressed into sheet. The sheet is then foamed/processed to remove skin and is then die cut into a preform. The preform is then hot/cold pressed into the final mold. In Injection Phylon (IP), raw material compound is injected directly into the final mold. In Compression Molded Preform Phylon (CMP), raw material compound is blown into a preform shape, and then it is buffed and hot/cold pressed into the final mold. In Direct Phylon (DP), raw material compound is pressed directly into the final mold. In the Examples, the CMP process is used to make flat molded parts.

In various embodiments, processes like those of FIG. 1 are improved by use of the foaming compositions described herein. By using the compatibilizer during the foaming and crosslinking of virgin resin incorporating scrap foam, suitable foam articles are produced that include an increased level of recycled foam material. Processes like IP and Phylon Direct, without a Phylon process, are less preferred in some embodiments.

In this way, foaming compositions and methods of their use increase the content of recycled EVA foam that can be introduced back into virgin EVA compound. By using compatibilizer as described herein, the content of recycled EVA can be increased, while still maintaining original main foam characteristics such as physical properties, bonding, impact resistant, and cosmetics. Until the present teachings, adding a high percentage of recycled EVA and diversion formulas led to sharp declines in physical properties and cosmetics. A high percent of recycled EVA tended to have rough uneven surfaces with occasional pucks and bubble blemishes. These foams having poor cosmetics result in structures that are uneven when observed from the outer skin toward the interior of the foam.

Now, however, using the compatibilizer improves the blending of partially crosslinked (recycled EVA) with uncrosslinked virgin EVA. The resulting foam structure maintains physical properties at an acceptable level that improves the cell structure and eliminates cosmetic blemishes. Advantageously, using the compatibilizer permits incorporation of up to 19% by weight of EVA recycled foam content, or 30 parts of recycled foam per 100 parts of virgin resin.

EXAMPLES

Further non-limiting description of the invention is given in the following examples, in which the abbreviations have the following meanings.

In the tables, all physical properties were determined in laboratory standard tests in common use in the EVA foam industry. In addition, the following abbreviations are used:

| Abbreviation | Definition |
| --- | --- |
| EVA(21% VA) | A copolymer of ethylene and vinyl acetate with 21 mol % vinyl acetate |
| CACO3 | Calcium carbonate filler |
| St-Ac | Stearic acid lubricant |
| ZnO | Zinc oxide; activator |
| TiO2 | White pigment titanium dioxide |
| Blue MB | Master batch of blue pigment |
| EVA SCRAP | Scrap EVA foam to be recycled. Lab scrap EVA foam |
| Azo (ADCA) - 50% | Commercial product - master batch with 50% EVA polymer and 50% blowing agent wherein the blowing agent is modified diazocarbonamide |
| DCP | Dicumyl peroxide |
| 60 NS | Compatibilizer |
| Test M7663 and M7766 and M7882 | Standard foam characteristics tests as listed |
| Test M8202 Impact testing | Standard impact tests as listed |
| Bonding Trials M8076 | Standard bonding tests as listed |

Lab test M7882 covers two different tests. The first test set is made on the starter foam, wherein the foam physicals are measured as the foam expands from the mold cavity and before any further skive or compression process. The second test measures the final phylon properties. The thickness, hardness, and density of the starter foam are measured to determine by how much to compress (determined as a compression ratio) to reach the target requirements of hardness and density. The starter foam is then skived to a suitable certain thickness and loaded into the mold cavity for further treatment. A process of heating and cooling is applied to produce a final part that is sent for physical testing.

Test M 5202 is impact testing. A simple ball drop test method is used to indicate how much energy is absorbed by the foam.

M5076 is a peel test. A standard adhesion process is used to apply glue between a rubber slab and a test foam slab. The bond score indicates the bondability between two substrates. The higher, the better.

The comparative example and working examples illustrate the composition and properties of various foams produced that contain up to 30% recycled EVA foam and higher. Further considerations for making the Examples include the following.

1. Raw Material Handling

Phylon production and EVA midsole production are like other industrial process, in that the essential factors are not necessarily the exact times and temperatures that are used, but rather the consistency of the process that is being followed. However, since the processes involve chemical reactions, there are certain limits to keep in mind. Keeping tight control on the processing variables minimizes the chances of having to reject the final product.

1. Kneader Mixing

A kneader is used to mix the individual chemicals together, helping to disperse them evenly throughout the compound. Order of addition of the different chemicals and mixing time should be clearly directed. Typically the EVA Polymer and other ingredients such as TiO2, filler are loaded together and mixed for 10-13 min. DCP (Dicumyl Peroxide) and Blowing agent are then added and mixed for 1.5 to 2 min. Mixing of the DCP and blow agent should be no more than 2 minutes prior to dumping the batch as overheating will cause these chemicals to react prematurely. For safety concern, an alternative is to add DCP and blowing agent on open mill instead.

Alternatively, EVA scrap and pellets are blended on open mill with compatibilizer first until it reached homogenous phase, before then taking it to kneader and following the regular mixing procedure to add other additives. Dumping temperature should be 110° C.±10° C. After dumping the batch goes to the first mill.

2. Mixing Roll #1

The importance of this stage is to:

cool the dumped material as quickly as possible to minimize premature reaction of the blowing agent, transform the batch into manageable sheet stock, and complete dispersal of the blowing agent and DCP.

Milling time is conveniently set to match kneader mix time so that each batch can be cleared prior to the next kneader batch finishing. Roll temperatures are maintained at 60° C.±5° C. to ensure sufficient cooling of the batch without making it too cold and stiff to band. Material temperature after mixing should be 75° C.±10.

3. Batch Averaging

Batch averaging is done to even out slight batch to batch differences in color or blow agent level. This improves consistency. Each batch out of the first mill is divided into three portions. Each of these portions is combined with a third of the next two batches and transferred to the second mill. Usually there will be a staging area of bins or hanging racks to allow for the batch averaging.

4. Mixing Roll #2

The second mixing roll blends the batch average portions together and sheets material off ready for the calender. Standard operating conditions are like those of Mixing Roll #1. Stock from the second roll should proceed immediately to the calender. Keeping a steady and continuous flow of material will facilitate the maintenance of a First-In-First-Out procedure, which helps to achieve consistency throughout production.

5. Calender

Batches are transferred to the calender after roll #2. The speed of the calender is set in such a way that it synchronizes with the mixing time of mixing roll #2. Sheets exiting the calender are preferably than 50° C. on the surface and have a thickness of about 3 mm. This allows rapid cooling so that unwanted reaction of the blowing agent is minimized. If sheets are stacked then some means of air flow can be provided to improve cooling.

6. Maturing Stage:

Although it is not essential, a 6 hour minimum maturing time is recommended.

2. Compression Molded Pre-form Phylon (CMP)

In the CMP process, individual size round pre-forms are blown from compound and buffed to the final pre-form shape. This process can make about 50% material saving comparing to conventional large EVA sheet which has to be skived, cut, buffed to get the final preform shape. While CMP requires two sets of model-specific tooling—one for the pre-forms and one for the final parts—this added cost is offset by reduced compound waste.

The starting operations (weighing, batch up, compounding, and mixing) are essentially the same as with conventional EVA. Pre-forms are then molded using one to twelve cavity molds in special "fast-opening" presses. These molds are heated with oil or electric elements to increased temperature control and a higher molding temperature. A typical molding time is 20 minutes at 155-160° C. with lab flat mold.

1. Pre-Form Process

The pre-form mold cavities must be filled with a pre-calculated weight of compound. Accurate weigh-up and consistent loading of the cavities are key to ensuring consistent final phylon parts. For this reason (and to eliminate rework waste from calender sheet), the use of pellets is now required for CMP molding.

2. Pre-form press and stabilization process

After pressing, molds will rapidly open and let the pre-forms "pop" out of the cavities. The demolded pre-forms must be put immediately into a stabilizing oven to let them reach dimensional stability. Because dimensional control of the pre-form is less critical with CMP pre-forms than with IP pre-forms, the stabilization regime for CMP is shorter and uses a lower oven. CMP does not require a stabilization wash.

After the pre-forms are stabilized, they are held for two hours before they are transferred to phylon pressing. If a less shiny cosmetic appearance is required, the sidewalls are lightly buffed. This buffing should be minimal, since excessive buffing will remove material and lead to final part inconsistency. For flat testing slab, an accurate compression ratio calculation is needed to decide what is the final density and hardness to reach, then skive the core-form (starter foam) thickness accordingly.

CMP pre-forms are pressed in exactly the same way as done for Conventional Phylon and the same concepts of compression ratio (CR) and pre-form design apply. The CMP process allows greater design flexibility in the pre-form, which can give greater control over final part hardness and easier loading of pre-forms into phylon molds.

EVA compounding process is similar to standard rubber foaming process except for the final molding process. In the Phylon process a starter foam is first blown which has lighter density and softer hardness, and then a compression ratio is calculated to reach the final target hardness and density. In a typical Phylon process, times in the heating and cooling press are determined from press trials. The heating cycle ensures that the surface of the perform reaches at least 140° C. for at least one minute. The cooling time should ensure that the molded part reaches a temperature of less than 30° C. (in the interior of the part). A typical press cycle is 10 mins. heating with 155° C. steam, and then 10-15 minutes cooling with 10° C. chilled water. Exact times for these steps will vary from model to model and may even vary for different sizes of the same model. The press holding pressure normally is 100 kg/cm2.

With these considerations, in mind, Comparative Example 1 shows how appearance and physical properties are negatively affected as higher levels of scrap foam (EVA scrap) are incorporated. At a level of 19% scrap incorporation by weight, the foam quality is poor.

Example 2 and Example 3 show incorporation of scrap foam into virgin EVA resin when the compatibilizers of the invention are used.

Comparative Example 1

| | Recycled content | | | | | |
|---|---|---|---|---|---|---|
| | 0% | 7% | 14% | 19% | 24% | 28% |
| | | | Example no. | | | |
| | 1A | 1B | 1C | 1D | 1E | 1F |
| EVA (21% VA) | 100 | 100 | 100 | 100 | 100 | 100 |
| CACO3 | 5 | 5 | 5 | 5 | 5 | 5 |
| St-Ac | 1 | 1 | 1 | 1 | 1 | 1 |
| ZnO | 1.5 | 1.5 | 1.5 | 1.5 | 1.5 | 1.5 |
| TiO2 | 5.5 | 5.5 | 5.5 | 5.5 | 5.5 | 5.5 |
| Blue MB | 0.2 | 0.2 | 0.2 | 0.2 | 0.2 | 0.2 |
| EVA SCRAP (use the same scrap for all)(use lab scrap) | 0 | 10 | 20 | 30 | 40 | 50 |
| Azo(ADCA)-50% | 10 | 11 | 12 | 13 | 14 | 15 |
| DCP | 0.7 | 0.63 | 0.56 | 0.49 | 0.42 | 0.35 |
| Total | 123.9 | 134.83 | 145.76 | 156.69 | 167.62 | 178.55 |
| Foam Quality | Good | Fair | Fair to Poor | Poor | Poor | Very Poor |
| Cure temp | 160° C. (320° F.) | 160° C. (320° F.) | 160° C. (320° F.) | 160° C. (320° F.) | 160° C. (320° F.) | 160° C. (320° F.) |
| Mold (mm) | 6 | 6 | 6 | 6 | 6 | 6 |
| Starter Time | 750 Sec | 750 Sec | 750 Sec | 750 Sec | 750 Sec | 750 Sec |
| Test M7663 | A | B | C | D | E | F |
| Durometer Asker C/ Shore 000 | 45; 45; 45; 44; 45 | 43; 43; 44; 45; 43 | 44; 45; 44; 44; 43 | 43; 43; 42; 43; 44 | 40; 41; 41; 40; 40 | 37; 37; 34; 37; 34 |
| Tensile (kg/cm2) | 26; 28; 27 | 25; 27; 26 | 24; 25; 24 | 22; 23; 22 | 20; 19; 20 | 16; 17; 18 |
| Elongation (%) | 232; 251; 242 | 259; 260; 267 | 266; 264; 276 | 247; 262; 257 | 233; 212; 234 | 212; 230; 243 |
| Tear (kg/cm) | 10; 10; 11 | 10; 10; 10 | 10; 10; 10 | 9; 9; 9 | 9; 9; 9 | 9; 8; 8 |
| Split tear (kg/cm) | 2.2; 2.2; 2.2 | 2.4; 2.4; 2.4 | 2.4; 2.4; 2.4 | 2.4; 2.5; 2.4 | 2.3; 2.4; 2.4 | 2.3; 2.3; 2.4 |
| Specific Gravity (g/cc) | .19; .16; .16 | .16; .15; .15 | .15; .15; .15 | .14; .15; .14 | .14; .14; .14 | .14; .13; .14 |
| Compression set (%) | 65; 62; 60; 64; 61 | 65; 65; 66; 66; 64 | 67; 66; 69; 69; 67 | 72; 71; 73; 69; 69 | 76; 79; 72; 77; 75 | 76; 80; 79; 78; 80 |
| Resiliency (%) | 42; 42 | 43; 43 | 40; 40 | 42; 42 | 40; 40 | 41; 41 |
| Shrinkage (%) | 3.6; 3.6; 3.8; 3.8 | 2.9; 2.7; 3.1; 2.7 | 2.5; 2.5; 2.3; 2.3 | 2.3; 2.3; 2.3; 2.3 | 2.7; 2.7; 2.7; 2.7 | 2.1; 2.3; 2.3; 2.1 |

Example 2

| The aim of this project is to determine the effects of 60NS on the finished surface of 14% to 19% Recycled foam | | | |
|---|---|---|---|
| Recycled content | 0% | 14% | 19% |
| Example no. | 2A | 2B | 2C |
| EVA(21% VA) | 100 | 100 | 100 |
| CACO3 | 5 | 5 | 5 |
| 60NS | | 2 | 2 |

| The aim of this project is to determine the effects of 60NS on the finished surface of 14% to 19% Recycled foam | | | |
|---|---|---|---|
| St-Ac | 1 | 1 | 1 |
| ZnO | 1.5 | 1.5 | 1.5 |
| TiO2 | 5.5 | 5.5 | 5.5 |
| Blue MB | 0.2 | 0.2 | 0.2 |
| EVA SCRAP (use the same scrap for all) (use lab scrap) | 0 | 30 | 30 |
| Azo (ADCA) - 50% | 10 | 13 | 13 |
| DCP | 0.7 | 0.49 | 0.49 |
| Total | 123.9 | 156.69 | 158.69 |
| Foam Quality | Good | Good | Good |
| Cure temp | 160° C. (320 F.) | 160° C. (320 F.) | 160° C. (320 F.) |
| Mold (mm) Starter | 6 | 6 | 6 |
| Time | 750 SEC | 750 SEC | 750 SEC |
| Test M7766 | Starter foam A | Starter foam B | Starter Foam C |
| Durometer Asker C/Shore 000 | 43; 44; 43; 43; 42 | 40; 40; 40; 40; 39 | 35; 37; 35; 35; 35 |
| Tensile (kg/cm2) | 28; 26; 26 | 20; 26; 24 | 20; 20; 17 |
| Elongation (%) | 277; 242; 255 | 217; 288; 267 | 300; 325; 267 |
| Tear (kg/cm) | 11; 10; 10 | 9; 9; 9 | 8; 8; 8 |
| Split tear (kg/cm) | 2.0; 1.8 | 2.7; 2.9 | 2.1; 2.5 |
| Specific Gravity (g/cc) | .16; .16; .16; .16; .16 | .14; .14; .14; .14; .13 | .13; .13; .13; .13; .13 |
| Compression set (%) | 60; 61; 63; 64; 66 | 72; 71; 70; 70; 73 | 71; 69; 74; 75; 76 |
| Resiliency (%) | 40 | 40 | 40 |
| Shrinkage (%) | 2.7; 2.5; 2.5; 2.5; 2.5 | 1.3; 1.3; 1.5; 1.5; 1.5 | 1.3; 1.3; 1.5; 1.5; 1.5 |
| Test M7766 | Phylon foam A | Phylon foam B | Phylon foam C |
| Durometer Asker C/Shore 000 | 59; 59; 59; 60; 60 | 54; 56; 55; 54; 53 | 50; 51; 50; 50; 51 |
| Tensile (kg/cm2) | 34; 35; 36 | 28; 33; 32 | 30; 30; 27 |
| Elongation (%) | 288; 283; 291 | 253; 298; 269 | 372; 368; 341 |
| Tear (kg/cm) | 18; 14; 15 | 15; 14; 16 | 14; 13; 14 |
| Split tear (kg/cm) | 2.4; 2.7 | 2.8; 2.9 | 2.4; 2.5 |
| Specific Gravity (g/cc) | .23; .23; .23; .24; .24 | .21; .21; .21; .22; .22 | .20; .20; .19; .20; .20 |
| Compression set (%) | 48; 48; 47; 49; 49 | 52; 51; 51; 54; 54 | 69; 69; 63; 63; 55 |
| Resiliency (%) | 46 | 45 | 44 |
| Shrinkage (%) | 1.3; 1.5; 1.5; 1.3; 1.3 | 1.1; 1.3; 1.3; 1.3; 1.5 | 1.1; 1.1; 1.1; 1.1; 1.3 |

Example 3

| The aim of this project is to determine the effects of 60NS on the finished surface of 14% to 19% Recycled foam | | | |
|---|---|---|---|
| Recycled content | 0% | 14% | 19% |
| Example no. | 3A | 3B | 3C |
| EVA(21% VA) | 100 | 100 | 100 |
| CACO3 | 5 | 5 | 5 |
| 60NS |  | 2 | 2 |
| St-Ac | 1 | 1 | 1 |
| ZnO | 1.5 | 1.5 | 1.5 |
| TiO2 | 5.5 | 5.5 | 5.5 |
| Blue MB | 0.2 | 0.2 | 0.2 |
| EVA SCRAP (use the same scrap for all) (use lab scrap) | 0 | 20 | 30 |
| Azo (ADCA) - 50% | 10 | 11 | 11 |
| DCP | 0.7 | 0.56 | 0.49 |
| Total | 123.9 | 145.76 | 156.69 |
| Foam Quality | Good | Good | Good |
| Cure temp | 160° C. (320 F.) | 160° C. (320 F.) | 160° C. (320 F.) |
| Mold (mm) Starter | 10 | 10 | 10 |
| Time | 1200 SEC | 1300 SEC | 1300 SEC |

| | | | |
|---|---|---|---|
| The aim of this project is to determine the effects of 60NS on the finished surface of 14% to 19% Recycled foam | | | |
| Test M7882 | Starter foam A | Starter foam B | Starter foam C |
| Durometer Asker C/Measured hardness | 39-41 | 35-38 | 29-41/32-36 remilled |
| Durometer Asker C/Shore 000 | 38; 39; 38; 39; 38 | 33; 33; 34; 32; 32 | 32; 34; 35; 33; 33 |
| Tensile (kg/cm2) | 23; 23; 25 | 23; 23; 24 | 21; 21; 21 |
| Elongation (%) | 211; 194; 198 | 311; 293; 296 | 441; 435; 431 |
| Tear (kg/cm) | 8; 7; 8 | 8; 7; 7 | 8; 9; 8 |
| Split tear (kg/cm) | 1.6; 1.5 | 2.0; 2.0 | 2.0; 2.3 |
| Specific Gravity (g/cc) | 0.14; 0.14; 0.14; 0.14 | 0.13; 0.13; 0.13; 0.13 | 0.13; 0.13; 0.13; 0.13 |
| Compression set (%) | 74; 79; 79; 77; 74 | 8; 77; 79; 76; 81 | 79; 80; 79; 79; 81 |
| Resiliency (%) | 40 | 38 | 37 |
| Shrinkage (%) | 3.3; 3.3; 3.3; 3.3 | 3.2; 3.1; 3.1; 3.2; 2.9 | 1.3; 1.3; 1.3; 1.7; 1.3 |
| Thickness (mm) | 12.2 | 12.3 | 13.2 |
| Peak G | 23.3 | 26.6 | 28.4 |
| Energy Loss (%) | 30 | 31 | 27 |
| Cure temp | 150° C. (305 F.) | 150° C. (305 F.) | 150° C. (305 F.) |
| Mold (mm)Starter | 10 | 10 | 10 |
| Time | 600 sec heat | 600 sec heat | 600 sec heat |
| Test 7882 | Phylon Foam A | Phylon Foam B | Phylon Foam C |
| Durometer Asker C/Measured hardness | 55-60 | 55-60 | 55-60 |
| Durometer Asker C/Shore 000 | 59; 59; 60; 58; 59 | 59; 60; 59; 59; 60 | 59; 59; 60; 59; 59 |
| Tensile (kg/cm2) | 42; 43; 41 | 51; 44; 46 | 47; 47; 41 |
| Elongation (%) | 313; 326; 317 | 431; 406; 401 | 570; 572; 551 |
| Tear (kg/cm) | 14; 14; 14 | 15; 15; 16 | 15; 15; 15 |
| Split tear (kg/cm) | 3.1; 3.0 | 3.1; 3.4 | 3.6; 3.5 |
| Specific Gravity (g/cc) | 0.23; 0.24; 0.23; 0.24 | 0.26; 0.26; 0.26; 0.26 | 0.26; 0.25; 0.26; 0.26 |
| Compression set (%) | 46; 46; 43; 43 | 49; 48; 48; 48 | 47; 47; 47; 47 |
| Resiliency (%) | 47 | 46 | 44 |
| Shrinkage (%) | 1.5; 1.7; 1.7; 1.7 | 1.3; 0.96; 1.1; 1.1 | 0.77; 0.77; 0.96; 0.58 |
| Test M7882 & M8202 Impact Testing | Phylon Foam A | Phylon Foam B | Phylon Foam C |
| Thickness (mm) 10 mm slabs | 10.1 | 10.1 | 10.1 |
| Peak G | 21.3 | 21 | 22.3 |
| Energy Loss (%) | 30 | 36 | 35 |
| Thickness (mm) 20 mm slabs | 20 | 20 | 20 |
| Peak G | 12 | 11.9 | 11.6 |
| Energy Loss (%) | 37.9 | 38.9 | 43.1 |
| Bonding Trials M8076 | Phylon Foam A | Phylon Foam B | Phylon Foam C |
| Material 1 | Foam Control | Foam 14% recycle | Foam 19% recycle |
| Cement system | NP-57 | NP-57 | NP-57 |
| Material 2 | OGRS001 | OGRS001 | OGRS001 |
| Bond Strength | 4.5; 4.4; 5.4 | 4.5; 5.4; 5.8 | 4.7; 4.9; 4.7 |
| Average Bond strength | 4.8 | 5.2 | 4.8 |
| % Difference vs Control | 0% | 8% | 0% |
| Failure | Foam failure | Foam failure | Foam failure |

Example 4

| Recycled content | 0% | 19% | 19% |
|---|---|---|---|
| | 4A | 4B | 4C |
| EVA 21% | 100 | 100 | 100 |
| CACO3 | 5 | 5 | 5 |
| 60NS | | 2 | |
| Rhenosin 260 | | | 2 |
| St-Ac | 1 | 1 | 1 |
| ZnO | 1.5 | 1.5 | 1.5 |
| TiO2 | 5.5 | 5.5 | 5.5 |
| Blue MB | 0.2 | 0.2 | 0.2 |
| EVA SCRAP (use the same scrap for all) (use lab scrap) | 0 | 30 | 30 |
| Azo (-50%) | 10 | 10 | 10 |
| DCP | 0.7 | 0.49 | 0.49 |
| Total | 123.9 | 155.69 | 155.69 |

| | | | |
|---|---|---|---|
| Cure temp | 160° C. (320° F.) | 160° C. (320° F.) | 160° C. (320° F.) |
| Mold (mm) Starter | 10 | 10 | 10 |
| Time | 1200 SEC | 1200 SEC | 1200 SEC |
| Test M7663 | Starter foam A | Starter foam B | Starter foam C |
| Durometer Asker C/Measured hardness | 39-41 | 33; 30; 30; 33; 30 | 33; 33; 35; 33; 33 |
| Durometer Asker C/Shore 000 | 38; 39; 38; 39; 38 | | |
| Tensile (kg/cm2) | 23; 23; 25 | 16; 16; 16 | 17; 17; 16 |
| Elongation (%) | 211; 194; 198 | 194; 197; 188 | 157; 165; 145 |
| Tear (kg/cm) | 8; 7; 8 | 6; 5; 5 | 5; 6; 5 |
| Split tear (kg/cm) | 1.6; 1.5 | 1.0; 1.0 | |
| Specific Gravity (g/cc) | 0.14; 0.14; 0.14; 0.14 | .09; .09; .09; .09; .09 | .10; .10; .10; .10; .10 |
| Compression set (%) | 74; 79; 79; 77; 74 | 79; 82; 75; 80; 79 | 76; 76; 74; 73; 75 |
| Resiliency (%) | 40 | 45 | 45 |
| Shrinkage (%) | 3.3; 3.3; 3.3; 3.3 | 1.7; 2.3; 2.1; 2.9; 2.9 | 2.9; 2.9; 2.9; 3.3; 2.3 |
| Cure Temp | 150° C. (305 F.) | 150° C. (305 F.) | 150° C. (305 F.) |
| Mold (mm) Starter | 10 | 10 | 10 |
| Time | 600 sec heat | 600 sec heat | 600 sec heat |
| Test M8280 | Phylon Foam A | Phylon Foam B | Phylon Foam C |
| Durometer Asker C/Measured hardness | 59; 59; 60; 58; 59 | 50; 50; 50; 51; 50 | 50; 49; 50; 51; 51 |
| Tensile (kg/cm2) | 42; 43; 41 | 28; 27; 28 | 31; 31; 30 |
| Elongation (%) | 313; 326; 317 | 280; 268; 280 | 252; 246; 243 |
| Tear (kg/cm) | 14; 14; 14 | 13; 13; 14 | 14; 14; 13 |
| Split tear (kg/cm) | 3.1; 3.0 | 1.5; 1.6 | 1.6; 1.6 |
| Specific Gravity (g/cc) | 0.23; 0.24; 0.23; 0.24 | .19; .19; .20; .20; .20 | .20; .20; .20; .20; 19 |
| Compression set (%) | 46; 46; 43 | 50; 56; 45; 57; 55 | 46; 50; 44; 47; 47 |
| Resiliency (%) | 47 | 49 | 48 |
| Shrinkage (%) | 1.5; 1.7; 1.7; 1.7 | 1.7; 1.7; 1.7; 1.7 | 2.5; 2.7; 2.7; 2.5; 2.1 |

In Example 3, the split tear of the as-foamed EVA material increases from 1.6, 1.5 to 2.0, 2.3 when going from virgin foam (Example 3A) to foam with 30 phr recycled EVA foam content (Example 3C). This is a significant difference, and the density of the samples in Example 3A and Example 3C are comparable. A similar trend is seen in the Phylon foams of Example 3. The trend is not seen in Example 4. It is believed that this is because the Phylon foams produced in Examples 3A and 3C did not have the same density, making comparison of the physicals problematic. The data show that split tear of a foam increases as the content of recycled scrap in the foam increases, and that the difference shows up in the data when foams of comparable density are compared. In a similar way, elongation appears to increase and shrinkage to decrease with increasing content of recycled scrap foam content.

In the prior art processes for recycling or reusing scrap EVA foam, incorporation of scrap lowers the physical properties (reflected in lower tear strength, higher shrinkage, and lower elongation, for example) of an EVA foam. But using the compatibilizers described herein, and exemplified in commercial products 60NS and Rhenosin 260, EVA foams contain up to 30 phr of scrap and maintain physical properties, even showing an improvement in the tear strength (higher), elongation (higher), and shrinkage (lower). Importantly for some application, the recycling method described herein results in acceptable aesthetic condition of the scrap-incorporated EVA foam.

The recycling method makes a positive contribution to sustainability. It will save raw material consumption and shows almost no trade off of its physicals and overall foam characteristics and performances when incorporating up to 30 phr of recycled content.

What is claimed is:

1. A foaming composition for making a foamed ethylene vinyl acetate copolymer article or articles incorporating recycled ethylene vinyl acetate foam, the composition consisting essentially of:

ethylene vinyl acetate (EVA) copolymer having 15-60 mole percent vinyl acetate;
scrap, at least partially crosslinked ethylene-vinyl acetate foam product;
peroxide crosslinking agent;
blowing agent for the vinyl acetate copolymer;
a compatibilizer comprising a hydrocarbon resin or a hydrogenated petroleum resin, and
optionally, a member selected from the group consisting of foam auxiliaries, foaming inhibitors, fillers, pigments, fire retardants, lubricants, activators, and combinations thereof.

2. A composition according to claim 1, wherein the compatibilizer comprises a resin produced by polymerizing a C5 cut obtained as a byproduct of petroleum cracking.

3. A composition according to claim 1, wherein the compatibilizer comprises a resin produced by polymerizing a C9 cut obtained as a byproduct of petroleum cracking.

4. A composition according to claim 1 comprising 1-19 percent by weight of the scrap foam product.

5. A composition according to claim 1, wherein the peroxide crosslinking agent comprises dicumyl peroxide.

6. A composition according to claim 1, wherein the blowing agent comprises a diazocarbamide.

7. A composition according to claim 1, comprising a filler selected from the group consisting of magnesium carbonate, magnesium silicate, and calcium carbonate.

8. A composition according to claim 1, comprising 1-4 parts of the compatibilizer based on 100 parts of the EVA copolymer.

9. A composition according to claim 1, comprising 1-19 percent by weight of the scrap foam product and 1-4 parts of the compatibilizer based on 100 parts of the EVA copolymer.

10. A foaming composition for making a foamed ethylene vinyl acetate copolymer article, the mixture comprising:

virgin resin consisting essentially of ethylene vinyl acetate (EVA) copolymer having 15-60 mole percent vinyl acetate;

scrap, at least partially crosslinked ethylene-vinyl acetate foam product;

peroxide crosslinking agent;

blowing agent for the vinyl acetate copolymer; and a compatibilizer comprising a hydrocarbon resin or a hydrogenated petroleum resin.

11. A composition according to claim 10, comprising 1-19 percent by weight of the scrap foam product and 1-4 parts of the compatibilizer based on 100 parts of the EVA copolymer.

12. A composition according to claim 10, comprising from 1 to 30 parts by weight of scrap ethylene-vinyl acetate foam product based on 100 parts by weight of virgin ethylene vinyl acetate (EVA) copolymer and comprising an amount of the compatibilizer that increases tear strength of a foamed article molded from the composition.

13. A composition according to claim 10, wherein the mixture comprises a single copolymer component consisting essentially of the virgin resin and the scrap ethylene-vinyl acetate foam product.

14. A foamed ethylene vinyl acetate copolymer article comprising:
   a crosslinked reaction product of a mixture comprising
   ethylene vinyl acetate (EVA) copolymer having 15-60 mole percent vinyl acetate;
   scrap, at least partially crosslinked ethylene-vinyl acetate foam product;
   peroxide crosslinking agent;
   blowing agent for the vinyl acetate copolymer; and
   a compatibilizer comprising a hydrocarbon resin or a hydrogenated petroleum resin;
wherein the copolymer article has increased split tear strength, reduced shrinkage, or both as compared to a foamed ethylene vinyl acetate copolymer article that is a crosslinked reaction product of a mixture that is substantially the same but without the compatibilizer.

* * * * *